United States Patent
Gong et al.

(10) Patent No.: US 8,289,733 B2
(45) Date of Patent: Oct. 16, 2012

(54) ADAPTIVE FREQUENCY JITTER FOR CONTROLLER

(75) Inventors: Xiaowu Gong, Singapore (SG); Siu Kam Kok, Singapore (SG); Yaw Hann Thian, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 439 days.

(21) Appl. No.: 12/577,926

(22) Filed: Oct. 13, 2009

(65) Prior Publication Data

US 2011/0085359 A1   Apr. 14, 2011

(51) Int. Cl.
*H02M 3/335* (2006.01)
(52) U.S. Cl. ............... 363/21.18; 363/41; 363/21.11
(58) Field of Classification Search ............... 363/21.18, 363/41, 21.11, 21.13; 323/283
See application file for complete search history.

(56) References Cited

U.S. PATENT DOCUMENTS

| | | | |
|---|---|---|---|
| 6,229,366 B1 | 5/2001 | Balakirshnan et al. | |
| 6,418,038 B2* | 7/2002 | Takahama et al. | 363/17 |
| 7,026,851 B2 | 4/2006 | Yang et al. | |
| 7,161,815 B2* | 1/2007 | Mori | 363/21.12 |
| 7,176,669 B2* | 2/2007 | Ueda | 323/351 |
| 7,342,528 B2 | 3/2008 | Ng et al. | |
| 7,504,810 B1* | 3/2009 | Tagare | 323/282 |
| 7,518,885 B2 | 4/2009 | Bäurle et al. | |
| 7,729,137 B2* | 6/2010 | Morota et al. | 363/21.12 |
| 7,888,921 B2* | 2/2011 | Tobin et al. | 323/282 |

OTHER PUBLICATIONS

Power Management DesignLine/Flyback transformer tutorial: function and design, Steve Chyo and Vithi Singh, Linear Technology, LT3972, 4 pages, Apr. 24, 2006.*
2.1.1 An Introduction to Switched Mode Power Supply Topologies, S.M.P.S., Power Semiconductor Applications, Philips Semiconductors, pp. 107-127, Dec. 3, 2006.*
"Three-PLL General Purpose FLASH Programmable Clock Generator", Cypress Semiconductor Corporation, CY22392, Dec. 14, 2002, 9 pgs.
Power Management DesignLine/ Flyback transformer tutorial: function and design, Steve Chyo and Vithi Singh, Linear Technology, LT3972, reprinted from the Internet at: http://www.powermanagementdesignline.com, 4 pgs.
"2.1.1 An Introduction to Switched Mode Power Supply Topologies", S.M.P.S., Power Semiconductor Applications Philips Semiconductors, pp. 107-127.

* cited by examiner

*Primary Examiner* — Harry Behm
(74) *Attorney, Agent, or Firm* — Eschweiler & Associates, LLC

(57) ABSTRACT

In order to convert an input power to one or more DC power levels that are provided to an output load, some aspects of the present disclosure relate to techniques for driving a switching regulator as a function of a pulsed voltage signal. In particular, this pulsed voltage signal is provided substantially at a target frequency, but exhibits frequency jitter that causes the pulsed voltage to vary slightly from the target frequency in time. The frequency jitter has a frequency range that varies as a function of the output load.

18 Claims, 5 Drawing Sheets

ADAPTIVE FREQUENCY JITTER FOR CONTROLLER

BACKGROUND

Electromagnetic interference (EMI), which may also be called radio frequency interference (RFI) in some instances, is a disturbance that affects an electrical circuit due to undesired electromagnetic conduction or electromagnetic radiation. For example, if an electrical circuit in a printer processes 850 kHz signals and nearby wireless transmitter transmits a competing 850 kHz wireless signal, the printer may experience significant signal degradation and possibly make printing mistakes because the wireless transmitter generates EMI that interferes with the printer's own internal signal processing.

To keep EMI within manageable levels, the Federal Communications Commission (FCC) in the United States and other regulatory agencies around the globe have promulgated regulations to establish acceptable EMI levels for electronic devices. Generally speaking, such regulations setup different classes of electronics devices, and assign a maximum EMI level that can be produced by devices within each class. In this way, consumers and businesses can have confidence that their electronic devices should function adequately without being concerned about interference from other devices.

One particularly problematic source of EMI is power supplies for electronic devices. These power supplies often convert power in one format to another format. For example, because some laptop computers include integrated circuits designed to operate on a DC voltage at 19.5 V (and because typical residential and commercial power outlets deliver an AC voltage at 60 Hz and 120 V); laptops often come with a power adapter that converts the AC voltage to a 19.5 V DC voltage, which is suitable for powering the laptop.

In many implementations, these power supplies include one or more switching elements that operate according to a pulse width modulated control signal, thereby maintaining an output power required for a given electronic device. However, because pulse width modulated switches operate at a relatively high frequency compared to the frequency of AC voltage, they can generate a high frequency signal that can cause conductive or radiative EMI problems. With regards to conductive EMI, the high frequency signals can be injected back into the AC mains and become an undesirable component of the AC mains signal. With regards to radiative EMI, the high frequency signals can also be radiated by the power supply as electromagnetic waves. In either case, the EMI generated by the power supply can cause problems for communications devices in the vicinity of the power supply.

Because power supplies generate a major component of the EMI for electronic devices, an important step in designing a power supply is limiting the EMI provided by the power supply to levels with the acceptable limits of the various standards. Therefore, the inventors have devised power supplies that exhibit favorable EMI characteristics while at the same time delivering power to an electronics device in a suitable manner.

DETAILED DESCRIPTION

Figure 1:
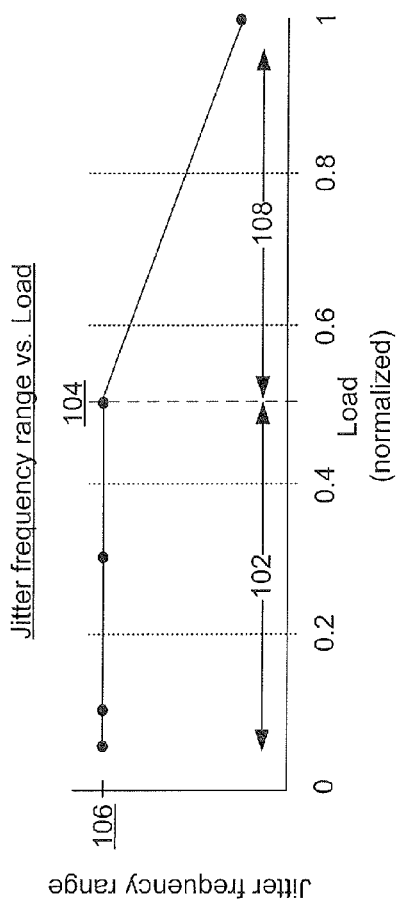
FIG. 1 is graph that illustrates one manner in which jitter frequency range can vary with different load conditions.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

In order to convert an input power to one or more DC power levels that are provided to an output load, some aspects of the present disclosure relate to techniques for driving a switching regulator as a function of a pulsed voltage signal. In particular, this pulsed voltage signal is provided substantially at a target frequency, but exhibits frequency jitter that causes the actual frequency of the pulsed voltage signal to vary from the target frequency in time. The frequency jitter has a frequency range that varies as a function of the output load. By "smoothing" out the frequency of the pulsed voltage signal over different jitter frequency ranges (instead of continuously "spiking" the pulsed voltage signal at precisely the target frequency), the adaptive frequency jitter techniques can "smooth" out EMI over the jitter frequency ranges and thereby limit the power emanated at the target frequency. This can provide a good blend of power conversion functionality and EMI characteristics.

For example, consider an instance where a power converter converts a 120 V AC signal from a residential power outlet to a 19.5 V DC signal suitable for driving a load comprising a laser printer. If the laser printer exhibits a first load condition (e.g., the printer is waiting to receive data and not yet printing), a pulsed voltage signal is delivered substantially at a target frequency, albeit with a first jitter frequency range, to provide the desired 19.5 V DC signal. By contrast, if the laser printer subsequently exhibits a second load condition (e.g., the printer is performing a print operation by driving various motors and extracting ink from a toner cartridge using a high voltage), the pulsed voltage signal is still delivered substantially at the target frequency to provide the desired 19.5 V DC signal, but the pulsed voltage signal now exhibits a second jitter frequency range that differs from the first frequency range. By dynamically adjusting the jitter frequency range to account for different load conditions, the techniques disclosed herein can provide a good blend of power conversion functionality while concurrently maintaining acceptable EMI levels.

FIG. 1 shows one manner in which jitter frequency range of a pulsed voltage signal can vary as a function of load. For relatively small loads 102 that are less than a threshold load level 104, the jitter frequency range has a first value 106. However, as the load is increased beyond the threshold load level at 108, the jitter frequency range starts to decrease. In the illustrated example, the jitter frequency range decreases linearly as the load is increased beyond the threshold value 104. However, in other embodiments the jitter frequency range could decrease according to other relations (e.g., quadratic, exponential, non-linear, periodic). Again, by dynamically adjusting the jitter frequency range to adjust for different load conditions, the techniques disclosed herein can provide a good blend of power conversion functionality while at the same time maintaining acceptable EMI levels. More particular implementations are now discussed with regards to the remaining figures.

Figure 2:
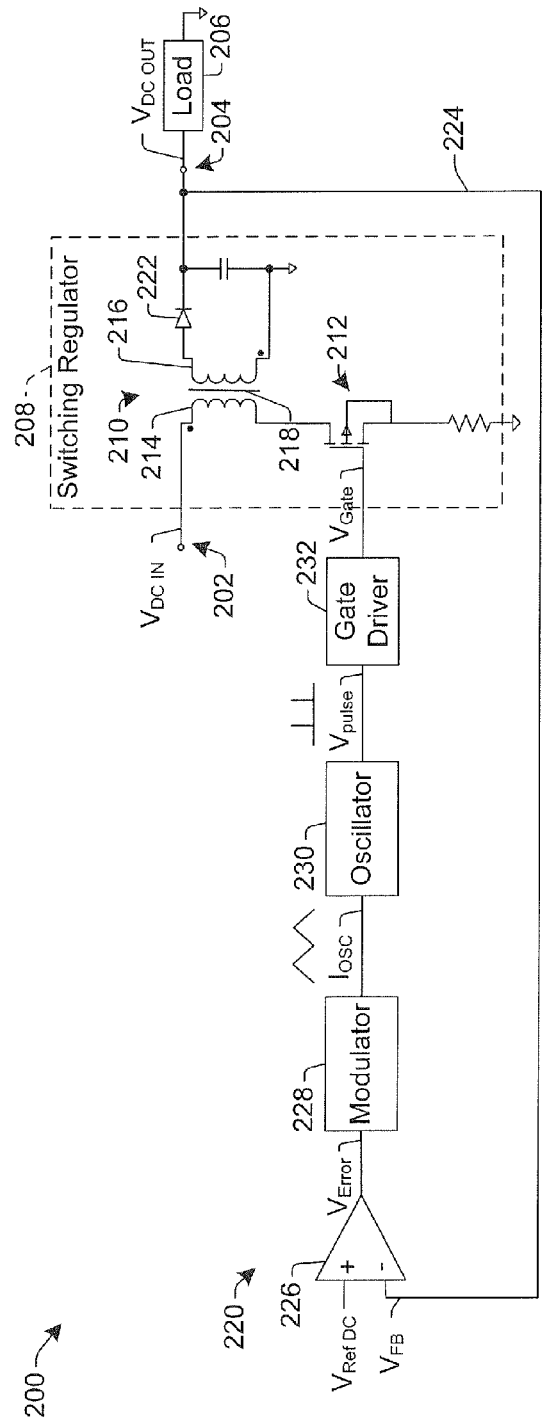
FIG. 2 is a component block diagram illustrating an apparatus for performing power conversion.

FIG. 2 shows a power converter 200 that makes use of adaptive frequency jitter in accordance with some embodiments. The power converter 200 includes an input terminal 202 and an output terminal 204. A DC supply signal ($V_{DC\_IN}$) is provided to the input terminal 202, from which the power converter 200 provides a DC output signal ($V_{DC\_OUT}$) to the output terminal 204 and a load 206 coupled thereto. For example, in one embodiment, the DC supply signal could be derived from an AC input signal (e.g., having a voltage of 120V at frequency of 60 HZ), and could be used to provide a DC output signal having a substantially constant voltage (e.g., a DC voltage of about 19.5 V suitable for a printer, laptop, or other electronics device). It will be appreciated that although the term "DC" implies a substantially constant voltage level, "DC" can also include small AC variations that vary about the DC voltage level. For example, as is appreciated by one of ordinary skill in the art, a 5.0 V DC voltage is a voltage that is at least substantially centered around 5.0V. However, due to signal processing, power demands, etc., a 5.0 V DC voltage may actually deviate in time somewhat from 5.0 V.

Structurally speaking, the input terminal 202 and output terminal 204 are disposed about opposing sides of a switching regulator 208, which includes a power transformer 210 and a switching element 212. The power transformer 210 includes inductively coupled conductors, typically in the form of a pair of coils 214, 216 that are wound around a core 218. The switching element 212 is coupled to a first coil 214 of the power transformer 210, and driven by control logic 220 such that the transformer 210 facilitates generation of a desired DC voltage on the output terminal 204.

Typically, when the switching element 212 is turned on, energy is stored in the first coil 214 of the transformer 210. The transformer 210 is arranged with respect to a diode 222 so there is little or no energy transferred to the load 206 while the switching element 212 is on. When the switching element 212 is turned off, the polarity of the transformer windings reverses due to a collapsing magnetic field in the transformer. This causes the diode 222 to conduct, thereby transferring the energy stored in the core to the load 206. This energy transfer to the load 206 continues until the transformer is depleted of energy or until the switching element 212 is once again turned on to reenergize the transformer.

Depending on the implementation, the power converter 200 can operate in either discontinuous mode or continuous mode. In the discontinuous mode, the energy stored when the switching element 212 is on/off is completely emptied from the core during the flyback period. In continuous mode, the switching element 212 is turned on before the core empties of flyback energy. In either case, control logic 220 can turn the switching element 212 on/off according to a target frequency suitable for providing a desired DC power to the output terminal 204.

To regulate the target frequency at which the switching element 212 is driven (and thereby regulate the output DC power), a first feedback loop 224 is included in the power converter 200. This feedback loop 224 compensates for changes in the load 206 coupled to the output terminal.

As shown, control logic 220 uses a feedback signal ($V_{FB}$) from the feedback loop 224 to provide a time-varying gate voltage ($V_{Gate}$), which drives the switching element 212 to provide a stable DC voltage at the output terminal.

The illustrated control logic 220 includes a comparator 226, a modulator 228, an oscillator 230, and a gate driver 232. Briefly, the comparator 226 compares the feedback voltage ($V_{FB}$) to a reference DC signal ($V_{REF\_DC}$), thereby providing an error signal ($V_{ERROR}$). The modulator 228 provides an oscillating current signal ($I_{OSC}$) based on the error signal ($V_{ERROR}$). The oscillator 230, in turn, provides a pulsed voltage signal ($V_{pulse}$) based on $I_{OSC}$. The pulsed voltage signal ($V_{pulse}$) includes a frequency jitter that has a frequency range that varies as a function of output load condition. Based on the pulsed voltage signal ($V_{pulse}$), the gate driver 232 delivers the gate voltage ($V_{Gate}$) to the switching element 212, thereby regulating the power through the transformer 210 to provide the desired DC voltage at the output terminal.

Figure 3:
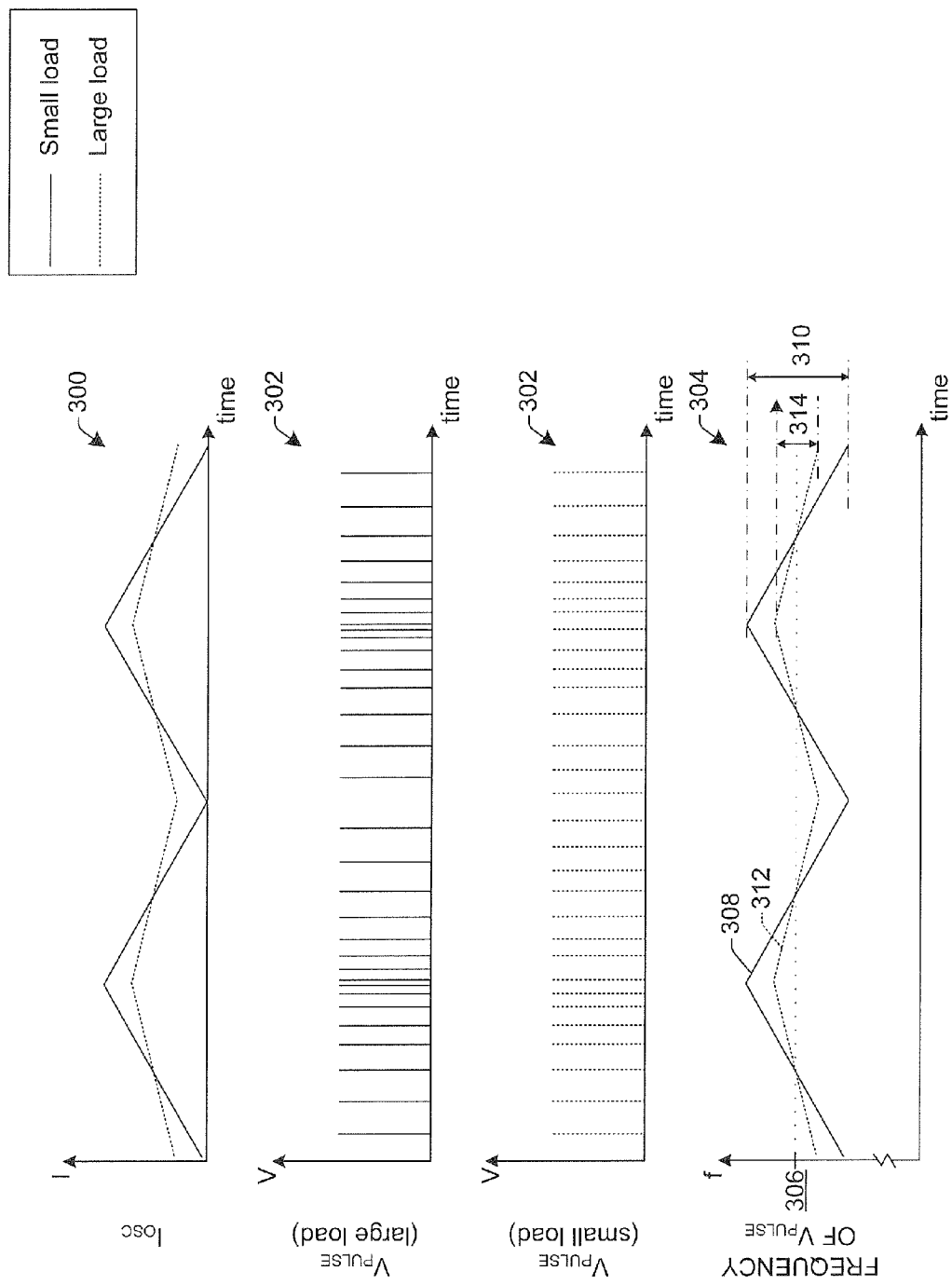
FIG. 3 is a series of waveforms that illustrate various signals when a power converter drives a relatively small load and a relatively large load.

FIG. 3 shows some sample waveforms in accordance with some implementations. It will be appreciated that these waveforms are merely one non-limiting example of signals that could be used, and other waveforms also fall within the scope of the present disclosure.

The illustrated waveforms include oscillating current signals 300 (e.g., $I_{OSC}$ from FIG. 2); pulsed voltage signals 302 (e.g., $V_{pulse}$ from FIG. 2), and frequencies 304 at which the pulsed voltage signals are provided. Notably, two different waveforms are provided for each signal—one of which (solid line) corresponds to a relatively small load (e.g., less than or equal to threshold load level 104 in FIG. 1) and the other of which (dashed line) corresponds to a relatively large load (e.g., greater than threshold load level 104 in FIG. 1).

As shown by waveforms 304, the illustrated pulsed voltage signals 302 are provided substantially at a target frequency 306. However, the illustrated pulsed voltage signals 302 exhibit frequency jitter that causes the frequency of the pulsed voltage signal to vary slightly from the target frequency 306. The frequency jitter has a frequency range that varies as a function of the output load condition. For example, for the relatively small load, the frequency of the pulsed voltage signal 308 has a first jitter frequency range 310. In contrast, for the relatively large load, the frequency of the pulsed voltage signal 312 has a second jitter frequency range 314.

Thus, consider an example where the target frequency 306 is about 100 kHz. For a relatively small load (e.g., load in low-power mode), the jitter frequency range 310 could be about 15% of the target frequency (e.g., the jitter frequency range 310 could be about 15 kHZ). On the other hand, for a relatively large load (e.g. load experiencing power surge), the jitter frequency range 314 could be about 4% of the target frequency (e.g., the jitter frequency range 314 could be about 4 kHz). By providing a relatively wide adaptive jitter frequency range, the techniques disclosed herein can help "smooth" out EMI over the jitter frequency range as a function of load, thereby helping to provide good EMI characteristics.

Figure 4:
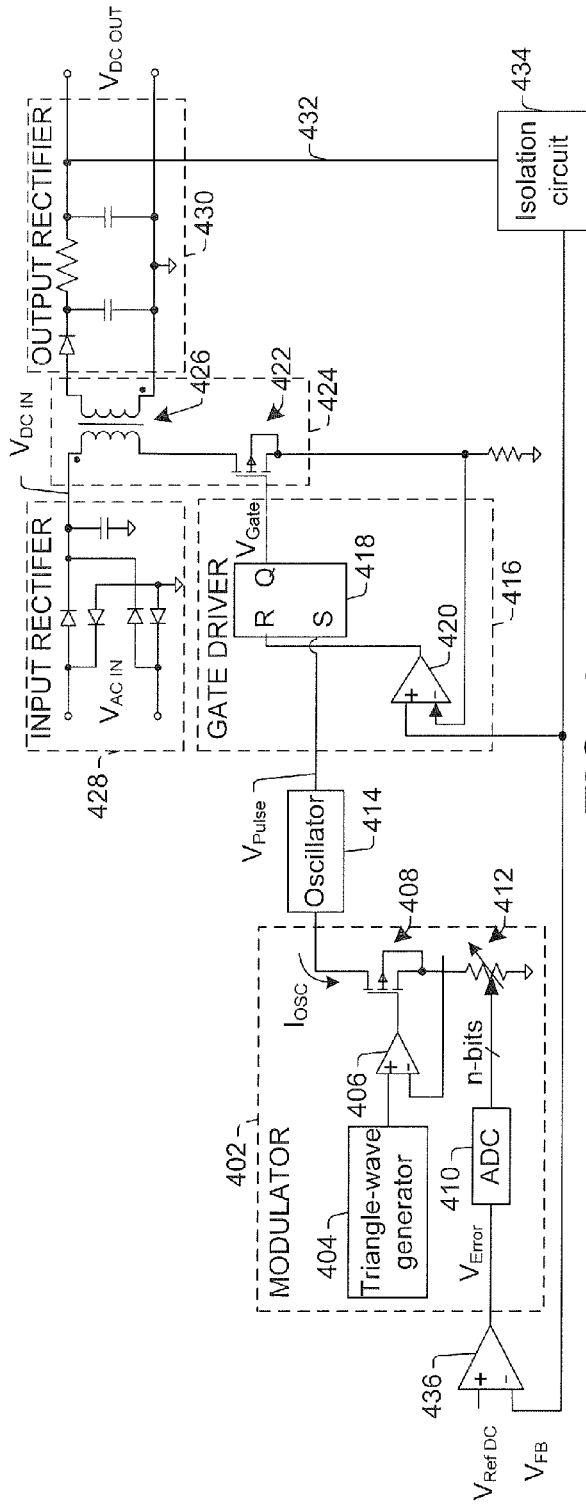
FIG. 4 is a component block diagram illustrating another apparatus for performing power conversion.

FIG. 4 shows another embodiment of a power converter 400 in accordance with some aspects of this disclosure. In this embodiment, a modulator 402 (e.g., modulator 228 in FIG. 2) comprises a triangle wave generator 404 and a comparator 406 that supply a time-varying gate voltage to a switching element 408. To control the amount of current $I_{OSC}$ into the switching element 408, an analog-to-digital converter (ADC) 410 provides n-bits (where n is an integer) to control the resistance of a variable resistor 412. In this manner, the modulator 402 provides a time-varying current $I_{OSC}$ that reflects an error signal $V_{ERROR}$. The error signal is a function of the difference between a feedback signal $V_{FB}$ and a reference DC signal $V_{REF\,DC}$, and can therefore reflect changes in an output load condition. Typically, the reference DC signal is fixed, although it need not be.

Based on the oscillating current signal $I_{OSC}$, an oscillator 414 (e.g., oscillator 230 in FIG. 2) provides a pulsed voltage signal ($V_{pulse}$). Again, this pulsed voltage signal can be provided substantially at a target frequency, but can exhibit an adaptive frequency jitter having a jitter frequency range that varies as a function of output load. See e.g., FIGS. 1 and 3 (supra) and FIG. 5 (infra).

A gate driver 416 (e.g., gate driver 232 in FIG. 2) receives the pulsed voltage signal and provides a gate voltage ($V_{Gate}$) as a function thereof. In the illustrated embodiment, the gate driver includes a Reset/Set (RS) latch 418, where the Set terminal receives the pulsed voltage and the Reset terminal is coupled to a comparator 420 that provides dynamic feedback. In other embodiments, stateful elements other than an RS latch (e.g., other types of latches or a flip-flop) could also be used.

The gate driver 416 drives a switching element 422 of a switching regulator 424, thereby inducing a transformer 426 to facilitate provision of a DC output voltage ($V_{DC\,OUT}$). In FIG. 4's illustrated example, the switching regulator 424 receives an input DC supply voltage ($V_{DC\,IN}$) from an input rectifier 428. In the illustrated example, the input rectifier 428 converts an input AC voltage ($V_{AC\,IN}$) to the DC supply voltage ($V_{DC\,IN}$). An output rectifier 430 converts the power from the transformer 426 into a DC output voltage ($V_{DC\,OUT}$).

A feedback path 432, which can include an isolation circuit 434 such as an optocoupler, for example, can provide the feedback signal ($V_{FB}$) to a comparator 436, thereby providing an error signal ($V_{Error}$) that accounts for changes in the output load.

Figure 5:
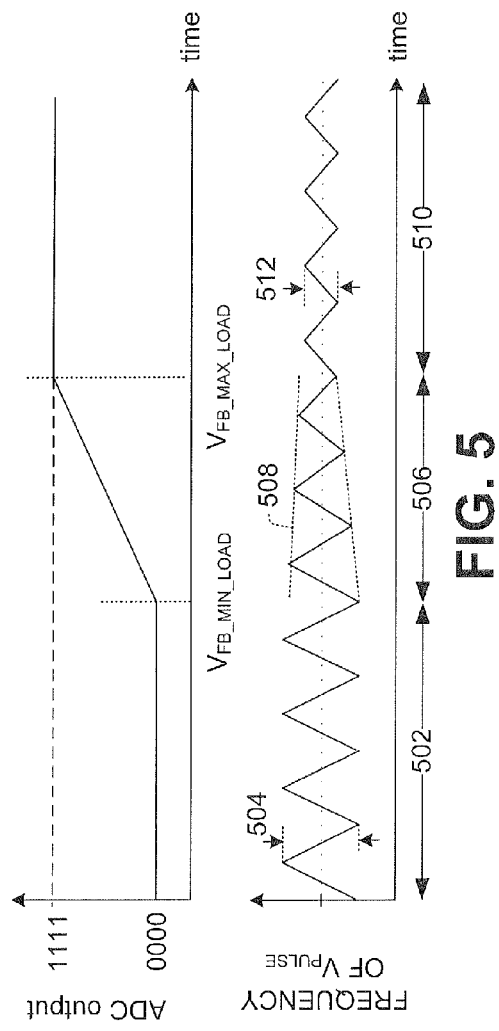
FIG. 5 is a pair of waveforms showing one example of how frequency jitter range can vary in time as a function of output load.

As shown in FIG. 5, as the output bits of the ADC 410 change to account for changes in output load condition, the oscillating current $I_{OSC}$ experiences a corresponding change. This change in $I_{OSC}$ induces a change in the jitter frequency range of the pulsed voltage signal ($V_{Pulse}$). Thus, during first time 502, the power converter supplies an output DC power to a relatively small load (e.g., normalized load less than threshold load value 104 in FIG. 1). Accordingly, during the first time 502, the jitter frequency range 504 is relatively large.

Subsequently, during second time 506 the output load gets smaller. The output of the ADC reflects this change in load by linearly increasing in digital value from 0000 to 1111. This change in ADC output causes a corresponding change in oscillating current $I_{OSC}$ (e.g., by changing the resistance of variable resistor 412 in FIG. 4). Consequently during time 506, the jitter frequency range of the pulsed voltage linearly decreases in a continuous manner as shown by envelope 508.

Finally, during third time 510 the output load reaches a relatively large value. The output of the ADC reflects this change in load by providing a fixed digital value of 1111 during this time 510. Consequently, during time 510, the jitter frequency range 512 of the pulsed voltage signal is relatively small.

Figure 6:
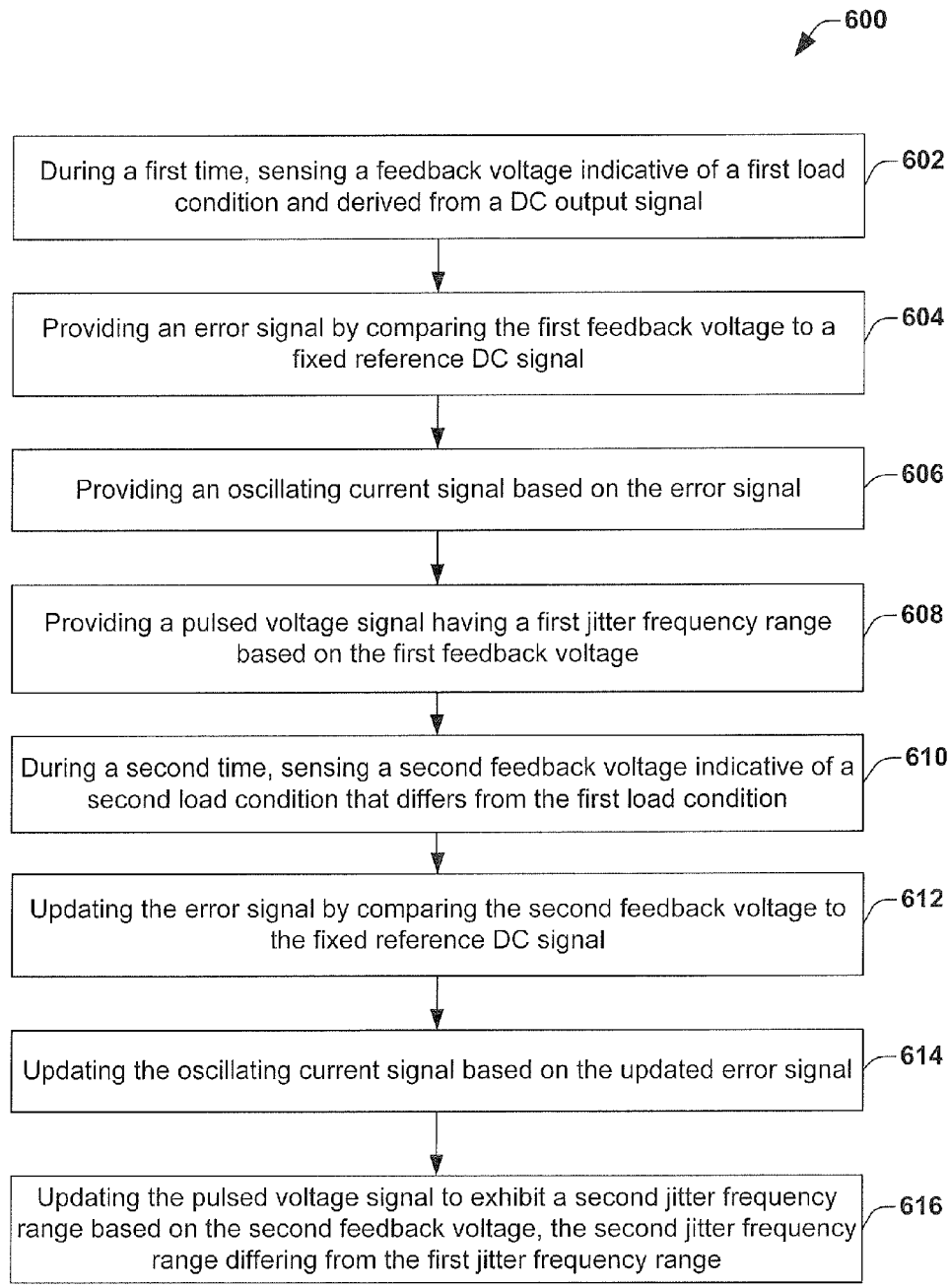
FIG. 6 is a flow diagram illustrating a method in accordance with some embodiments.
Figure 7:
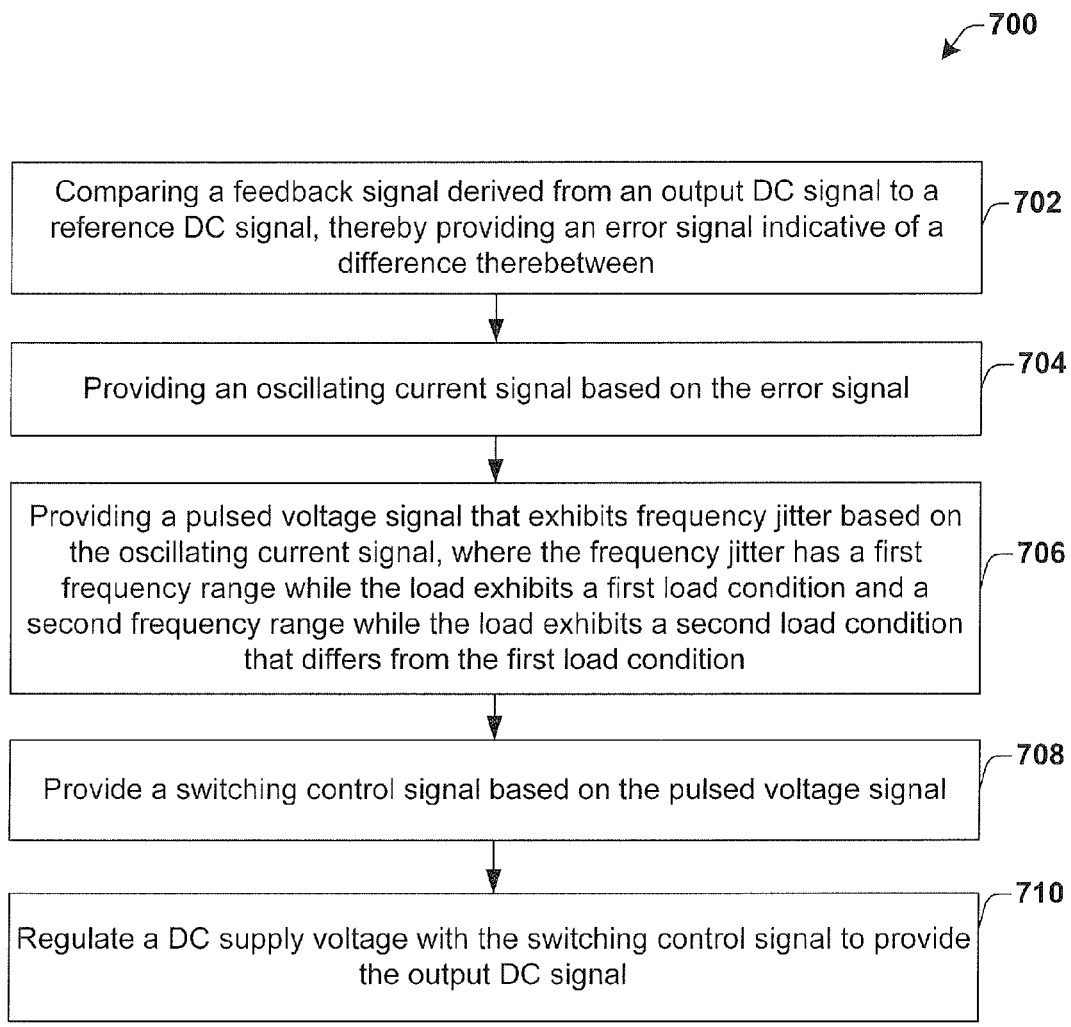
FIG. 7 is a flow diagram illustrating a method in accordance with some embodiments.

FIGS. 6-7 show some methodologies in accordance with some aspects of this disclosure. While these methods are illustrated and described below as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

FIG. 6 starts at 602 when a first feedback voltage is sensed during a first time. The first feedback voltage is indicative of a first load condition, and is derived from a DC output signal delivered to an output load exhibiting the first load condition.

At 604, an error signal is provided by comparing the first feedback signal to a fixed reference DC signal.

At 606, an oscillating current signal is provided based on the error signal. In one embodiment, the oscillating current signal can be provided by adjusting a resistance value of a variable resistor based on the error signal. See e.g., FIG. 4 (supra).

At 608, a pulsed voltage signal is provided substantially at a target frequency. Although the pulsed voltage signal is provided substantially at the target frequency, the pulsed voltage signal exhibits a first jitter frequency range that is based on the feedback signal sensed at the first time.

At 610, the load condition of the output load is changed and a second feedback voltage is sensed during a second time. Thus, the second feedback voltage is indicative of a second load condition that differs from the first load condition.

At 612, the error signal is updated by comparing the second feedback voltage to the fixed reference DC signal.

At 614, the oscillating current signal is updated based on the updated error signal.

At 616, the pulsed voltage signal is updated to exhibit a second jitter frequency range that differs from the first frequency jitter range. The second jitter frequency range differs from the first frequency range, and the jitter frequency ranges vary as a function of the change in the load condition of the output load.

FIG. 7 shows another methodology 700 in accordance with some embodiments. At 702, the method 700 compares a feedback signal derived from an output DC signal to a reference DC signal. In this manner, 702 provides an error signal indicative of a difference between the feedback signal and the output DC signal.

At 704, the method 700 provides an oscillating current signal based on the error signal.

At 706, the method 700 provides a pulsed voltage signal that exhibits frequency jitter based on the oscillating current signal. The frequency jitter has a first frequency range while the load exhibits a first load condition, and has a second frequency range while the load exhibits a second load condition that differs from the first load condition.

At 708, a switching control signal (e.g., gated signal) is provided based on the pulsed voltage signal.

At 710, the method 700 regulates a DC supply voltage with the switching control signal to provide the output DC signal at a desired DC voltage.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Certain terms are used throughout the specification to refer to particular system components. As one skilled in the art will appreciate, different companies can refer to a component by different names. This document does not intend to distinguish between components that differ in name but not function herein. In this document the terms "including" and "comprising" are used in an open ended fashion, and thus should be interpreted to mean "including, but not limited to . . . " Also, the term "couple" (and variations thereof) is intended to mean either an indirect or direct electrical connection. Thus, if a first element is coupled to a second element, that connection may be a direct electrical connection, or may be an indirect electrical connection via other elements and connections. Although various approximately numeric values are provided herein, these numeric values are merely examples should not be used to limit the scope of the disclosure.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A method of power conversion that accounts for a time-varying characteristic of a load, comprising:
   comparing a feedback signal derived from an output signal to a reference signal, thereby providing an error signal indicative of a difference therebetween;
   providing an oscillating current signal based on the error signal;
   providing a pulsed voltage signal that exhibits frequency jitter based on the oscillating current signal, where the frequency jitter has a first frequency range centered about a fixed target frequency while the load exhibits a first load condition and where the frequency jitter has a second frequency range centered about the fixed target frequency while the load exhibits a second load condition that differs from the first load condition.

2. The method of claim 1, further comprising:
   regulating a DC supply voltage based on the pulsed voltage signal to provide the output signal.

3. The method of claim 2, where the output signal is a DC voltage signal.

4. The method of claim 1, further comprising:
   providing a switching control signal to a switching element, where the switching control signal is based on the pulsed voltage signal; and
   regulating power though a transformer via the switching element, where the transformer comprises a winding coupled to the switching element.

5. The method of claim 1, where the first frequency range is defined by a difference between a peak frequency associated with the first load condition and a minimum frequency associated with the first load condition.

6. The method of claim 5, where the second frequency range is defined by a difference between a peak frequency associated with the second load condition and a minimum frequency associated with the second load condition.

7. The method of claim 1, further comprising:
   varying the frequency jitter from the first frequency range to the second frequency range in a linear fashion over a time interval.

8. An apparatus for driving a load, comprising:
   an input terminal to receive a DC supply signal;
   a switching regulator to regulate the DC supply signal as a function of a pulsed voltage signal and thereby provide a DC output voltage at an output terminal;
   a comparator to compare a feedback signal derived from the DC output voltage with a reference DC voltage, and to selectively generate an error signal based on the comparison; and
   control logic to provide the pulsed voltage signal substantially at a fixed, target frequency as a function of the error signal, the pulsed voltage signal exhibiting frequency jitter having a first frequency range while the load exhibits a first load condition and having a second different frequency range while the load exhibits a second load condition that differs from the first load condition;
   where the first and second frequency ranges have first and second central frequencies, respectively, which correspond to the fixed, target frequency.

9. The apparatus of claim 8, where the switching regulator comprises:
   a transformer comprising first and second windings wound around a core; and
   a switching element coupled to either the first or second winding.

10. The apparatus of claim 8, where the control logic comprises:
    a modulator to receive the error signal and provide an oscillating current signal therefrom;
    an oscillator to receive the oscillating current signal and provide the pulsed voltage signal therefrom; and
    a gate driver to receive the pulsed voltage signal and provide a gated voltage signal therefrom.

11. The apparatus of claim 10, where the modulator comprises:
    an analog-to-digital converter (ADC) to receive the error signal and provide a time-varying digital value that controls a variable resistor;
    a switching element coupled to the variable resistor; and
    a wave generator that controls the switching element to facilitate generation of the oscillating current signal.

12. The apparatus of claim 10, where the gate driver comprises a stateful element.

13. The apparatus of claim 8, further comprising an Input rectifier to receive an AC voltage and provide the DC supply signal therefrom.

14. The apparatus of claim 8, where the first and second frequency ranges are disposed about a target frequency at which the pulsed voltage signal is substantially provided.

15. A method, comprising:
    sensing during a first time a first feedback voltage indicative of a first load condition and derived from a DC output signal;
    providing a pulsed voltage signal having a first jitter frequency range based on the first feedback voltage;
    sensing during a second time a second feedback voltage indicative of a second load condition that differs from the first load condition;

updating the pulsed voltage signal to exhibit a second jitter frequency range based on the second feedback voltage, the second jitter frequency range differing from the first jitter frequency range;

where the first and second jitter frequency ranges have first and second central frequencies, respectively, which correspond to a fixed, target frequency for the DC output signal.

16. The method of claim 15, where the first and second jitter frequency ranges are disposed about a target frequency at which the pulsed voltage signal is to be substantially provided.

17. The method of claim 15, further comprising:

providing an error signal by comparing the first feedback voltage to a fixed reference DC signal;

providing an oscillating current signal based on the error signal; and providing the pulsed voltage signal having the first jitter frequency range based on the oscillating current signal.

18. The method of claim 17, further comprising:

updating the error signal by comparing the second feedback voltage to the fixed reference DC signal;

updating the oscillating current signal based on the updated error signal; and updating the pulsed voltage signal to exhibit the second jitter frequency range based on the updated oscillating current signal.

* * * * *